E. H. LEWIS.
WHEEL.
APPLICATION FILED MAR. 29, 1919.
1,346,756. Patented July 13, 1920.
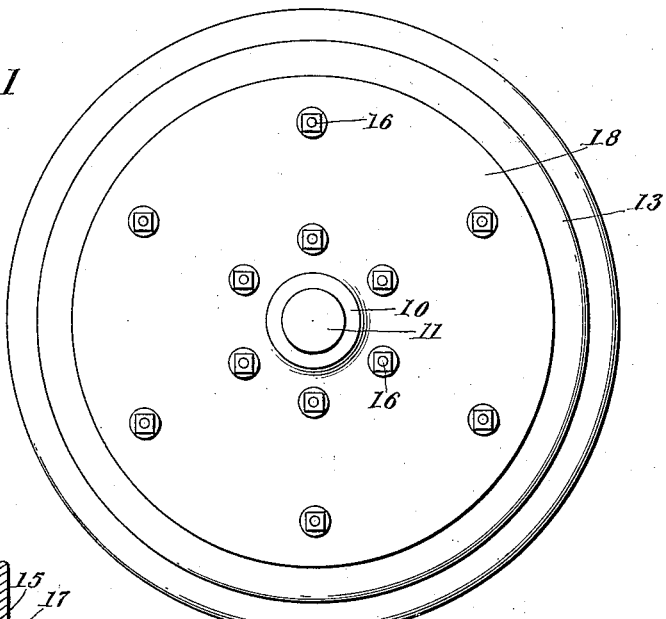
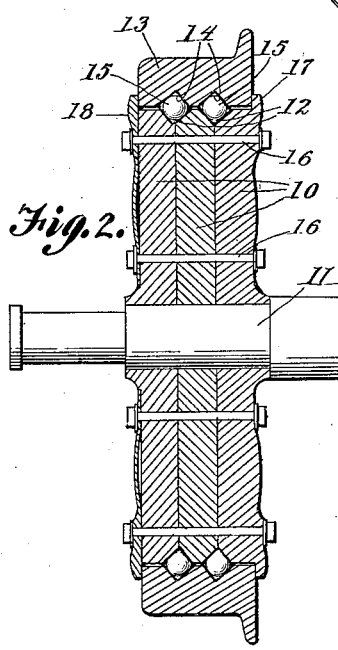
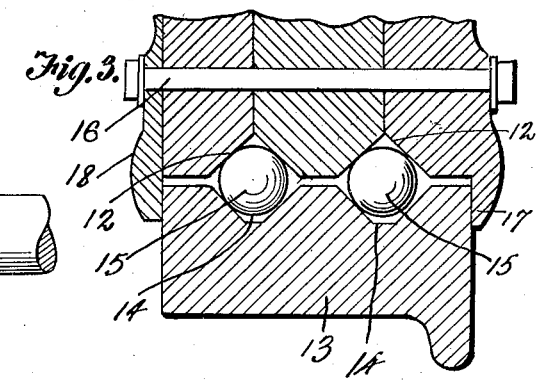
WITNESSES
INVENTOR.
Edward H. Lewis
BY
ATTORNEY.

UNITED STATES PATENT OFFICE.

EDWARD H. LEWIS, OF SCRANTON, PENNSYLVANIA.

WHEEL.

1,346,756.  Specification of Letters Patent.  Patented July 13, 1920.

Application filed March 29, 1919. Serial No. 286,000.

*To all whom it may concern:*

Be it known that I, EDWARD H. LEWIS, a citizen of the United States, residing at Scranton, in the county of Lackawanna and State of Pennsylvania, have invented new and useful Improvements in Wheels, of which the following is a specification.

This invention relates to wheels especially designed for use upon railway cars.

The object of the present invention is to provide a wheel having a removable tire or tread, which is capable of rotation independently of the wheel proper, the said tire or tread rotating upon anti-friction devices, so as to reduce friction, while the independent rotation of the tire or tread permits of a difference in speed upon opposite sides of the car, to further reduce friction with the rails at curves.

Another object is to provide a wheel of the above character which is simple and durable of construction and in which any of the parts may be readily replaced when necessary, thereby materially reducing the cost of operation.

Other objects and advantages of the invention will appear as the following description is read in connection with the accompanying drawings.

In the drawings:

Figure 1 is a side elevation of a wheel constructed in accordance with the present invention.

Fig. 2 is a central sectional view of the same.

Fig. 3 is an enlarged sectional view of a portion of the wheel showing the arrangement of the raceways of the anti-friction balls therein.

Referring to the drawings in detail, like characters of reference denote corresponding parts throughout the several views.

As illustrated, the wheel comprises a hub of relatively large diameter, which is formed of a plurality of independent disk sections 10. These sections are removably secured upon an axle 11 in a manner to rotate with the axle and are arranged in contacting relation with one another. The edges surrounding the contacting faces of the disk sections are grooved, as at 12, and when the sections are secured together, these grooves provide substantially semi-circular grooves extending entirely around the periphery of the hub.

Mounted upon the wheel hub is a tire or tread 13, the width of the latter being substantially the same as the width of the combined disk sections. The tire is also provided upon its inner periphery with annular grooves 14, which are adapted to register with the grooves in the disk sections to provide race-ways for the reception of anti-friction devices 15.

In assembling the wheel, the disk sections 10 are separated to provide for the insertion of the anti-friction devices 15 within the grooves and the said disk sections 10 are then secured together through the medium of bolts, or other fastening devices 16, which extend transversely through the disk sections. This serves to hold the tire or tread 13 upon the hub in a manner to permit free rotation of the former. The raceways for the anti-friction devices are rectangular in cross section and their walls are disposed at an angle of 90 degrees with respect to one another, so as the disk sections are assembled, the anti-friction devices, hereinshown as balls, may be dropped into place.

To further provide against lateral movement of the tire or tread 13 with respect to the hub, one of the sections 10, for example, the inner section may be provided upon one edge with an annular flange 17, which extends radially beyond the said section. The outermost disk section may have removably secured thereon an annulus 18, the purpose being to provide a removable flange, which coöperates with the flange 17 to provide an annular groove surrounding the hub for the reception of the tire or tread. The annulus 18 may be secured in place through the medium of fastening devices 16, which are provided for the purpose of holding the disk sections 10 together.

Any desired means may be utilized for securing the disk sections upon the axle 11, for example, they may be splined upon the said axle. This will permit the removal of one or all of the said sections, so that worn or damaged parts of the wheel may be easily replaced. As the tread or tire is subjected to the greatest wear, this may be easily replaced by removing the anti-friction devices through the separation of the disk sections.

While anti-friction balls are illustrated in connection with the invention, it is obvious that other devices may be substituted by changing the character of the grooves or race-ways 14. For example, anti-friction rollers may be used.

The invention is susceptible of various changes in its form, proportions and minor details of construction and the right is herein reserved to make such changes as properly fall within the scope of the appended claims.

Having described the invention, what is claimed is:

1. A wheel formed of separate disk sections adapted to be secured together upon an axle against independent rotation, said disk sections being grooved around the edge of their meeting faces, a tire surrounding the edges of the disk sections and having grooves therein coöperating with the before-mentioned grooves to provide race-ways and means for securing the disk sections together.

2. A wheel formed of separate disk sections adapted to be secured together upon an axle against relative rotation, said disk sections being grooved around the edges of their meeting faces, a tire surrounding the edges of the disk sections and having grooves therein coöperating with the before-mentioned grooves to provide race-ways, antifriction devices operating in said race-ways, means for securing the disk sections together and annular flanges carried by the outer faces of the outer disk sections to provide an annular groove for the reception of the tire.

In testimony whereof I affix my signature.

EDWARD H. LEWIS.